United States Patent
Higashi et al.

(10) Patent No.: US 8,703,350 B2
(45) Date of Patent: Apr. 22, 2014

(54) HEAT-RESISTANT ALLOY MEMBER, ALLOY MEMBER FOR FUEL CELL, COLLECTOR MEMBER FOR FUEL CELL, CELL STACK, AND FUEL CELL APPARATUS

(71) Applicant: Kyocera Corporation, Kyoto (JP)

(72) Inventors: Masahiko Higashi, Kirishima (JP); Tetsuro Fujimoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/846,635

(22) Filed: Mar. 18, 2013

(65) Prior Publication Data

US 2013/0288149 A1    Oct. 31, 2013

Related U.S. Application Data (62) Division of application No. 12/091,734, filed as application No. PCT/JP2006/321540 on Oct. 27, 2006, now abandoned.

(30) Foreign Application Priority Data

Oct. 27, 2005  (JP) .................................. 2005-312576
Jan. 18, 2006  (JP) .................................. 2006-009864

(51) Int. Cl.
   *H01M 8/24*    (2006.01)
   *H01M 8/10*    (2006.01)

(52) U.S. Cl.
   USPC .......................................... 429/452; 429/465

(58) Field of Classification Search
   None
   See application file for complete search history.

(56) References Cited

U.S. PATENT DOCUMENTS

| 2002/0081478 A1 | 6/2002 | Busenbender |
| 2003/0075454 A1 | 4/2003 | Nora et al. |
| 2005/0260467 A1 | 11/2005 | Bednarz et al. |

FOREIGN PATENT DOCUMENTS

| DE | 2004024621 A | 3/2004 |
| JP | 08185870 A | 7/1996 |
| JP | 2005011029 A | 1/2005 |
| JP | 3712733 B | 8/2005 |
| WO | 2004111291 A2 | 12/2004 |

OTHER PUBLICATIONS

Japanese language office action dated May 24, 2011 and its English language translation for corresponding Japanese application 2006292869 cites the foreign patent document above.

*Primary Examiner* — Yoshitoshi Takeuchi
(74) *Attorney, Agent, or Firm* — DLA Piper LLP (US)

(57) ABSTRACT

The present invention provides a heat-resistant alloy member which hardly causes external diffusion of Cr, an alloy member for a fuel cell, a collector member for a fuel cell, a cell stack, and a fuel cell apparatus.

The surface of a collector base material 201 containing Cr is coated with a Cr diffusion preventing layer 203 made of an oxide containing Zn and Mn and a coating layer 202 made of an oxide containing Zn is formed on the surface of the Cr diffusion preventing layer 203. The coating layer 202 preferably contains at least one kind of Al and Fe as a trivalent or higher valent positive metal element.

6 Claims, 9 Drawing Sheets

HEAT-RESISTANT ALLOY MEMBER, ALLOY MEMBER FOR FUEL CELL, COLLECTOR MEMBER FOR FUEL CELL, CELL STACK, AND FUEL CELL APPARATUS

BACKGROUND OF THE INVENTION

1. Field of the Invention

The present invention relates to a heat-resistant alloy member in which the surface of an alloy member containing Cr is coated with a Cr diffusion preventing layer, an alloy member for a fuel cell, a collector member for a fuel cell, a cell stack, and a cell apparatus.

2. Description of the Related Art

As a next-generation energy system, for example, various fuel cell apparatuses comprising a container and a cell stack of fuel cells housed in the container have recently been proposed. A solid electrolyte fuel cell is formed by housing a cell stack comprising plural fuel cell cells, which are electrically connected to each other, in a container. A fuel gas (hydrogen) is allowed to flow to the side of a fuel electrode of a fuel cell and air (oxygen) is allowed to flow to the side of an air electrode (also referred to as an oxygen electrode) thereby generating power at a high temperature of 550 to 900° C. A felt- or plate-like collector member has conventionally been used so as to electrically connect between fuel cells.

An alloy having high conductivity is employed as the collector member and also a heat-resistant alloy is preferably employed since it is used at a high temperature. As the heat-resistant alloy having high conductivity, an alloy containing 10 to 30% by mass of Cr is usually employed. However, when a collector member made of an alloy containing Cr is interposed between fuel cells thereby electrically connecting plural fuel cells to each other, Cr in the collector member diffuses out from the collector member during power generation of the fuel cell for a long period and the diffused Cr reaches the interface between the air electrode and the solid electrolyte, resulting in deterioration of activity. This phenomenon is so-called Cr poisoning and causes deterioration of power generation ability of the fuel cell.

The surface of an alloy member containing Cr has conventionally been coated with Mn, Fe, Co or Ni so as to prevent the Cr poisoning (refer to Kohyo (National Publication of Translated Version) No. 11-501764).

However, when the surface of a Cr-containing alloy member is coated with Mn, Fe, Co or Ni as described in Kohyo (National Publication of Translated Version) No. 11-501764, Cr still diffuses drastically, although it is possible to suppress Cr in the Cr-containing alloy member from diffusing out to some extent.

SUMMARY OF THE INVENTION

An object of the present invention is to provide a heat-resistant alloy member which hardly causes external diffusion of Cr, an alloy member for a fuel cell, a collector member for a fuel cell, a cell stack, and a fuel cell apparatus.

The heat-resistant alloy member of the present invention includes a Cr diffusion preventing layer made of an oxide containing Zn and Mn, and an alloy member containing Cr, whose surface is coated with the Cr diffusion preventing layer. The oxide containing Zn and Mn of the Cr diffusion preventing layer is a metal oxide having at least one kind of a spinel structure, a corundum structure, a wurtzite structure and a rock salt structure, or a structure similar to these structures. The oxide containing Zn and Mn is formed from at least one kind of $(Zn,Mn)Mn_2O_4$ and ZnO—MnO solid solutions. The Cr diffusion preventing layer may sometimes contain Fe.

It is considered that the Cr diffusion preventing layer is thermodynamically stable and therefore it is difficult for Cr to form a solid solution, thus making it possible to suppress Cr from diffusing out from the alloy member.

In the heat-resistant alloy member of the present invention, a coating layer made of an oxide containing Zn is formed on the surface of the Cr diffusion preventing layer. In such a heat-resistant alloy member, the surface of the Cr diffusion preventing layer can be protected with a coating layer.

Furthermore, in the heat-resistant alloy member of the present invention, the Cr diffusion preventing layer and the coating layer have conductivity at high temperature. Such a heat-resistant alloy member exhibits conductivity at high temperature. Thus, it is possible to provide a heat-resistant alloy member which is used in a high temperature range and has conductivity, and also hardly causes external diffusion of Cr.

Also, in the heat-resistant alloy member of the present invention, the coating layer contains Zn and a trivalent or higher valent positive metal element. In such a heat-resistant alloy member, it is possible to impart conductivity by allowing a trivalent or higher valent positive metal element to enter into solid solution in at least a portion of a coating layer made of zinc oxide, and to realize a heat-resistant alloy member capable of maintaining conductivity and improving the Cr diffusion prevention effect.

Furthermore, in the heat-resistant alloy member of the present invention, the coating layer contains at least one kind of Al and Fe as the trivalent or higher valent positive metal element. In such a heat-resistant alloy member, conductivity can be easily improved by the addition of Al or Fe having a valence of +3.

Also, in the heat-resistant alloy member of the present invention, the coating layer has conductivity of 1 $S \cdot cm^{-1}$ or more at a temperature of 550 to 900° C. In such a heat-resistant alloy member, it is possible to realize an alloy member for a fuel cell which can be suited for use as a conductive member within a range of the operating temperature of the fuel cell.

Furthermore, the Cr diffusion preventing layer is made of $(Zn,Mn)Mn_2O_4$. In such a heat-resistant alloy member, it is possible to effectively suppress Cr from diffusing out from an alloy member.

Also, in the heat-resistant alloy member of the present invention, a film containing Zn is formed on the surface of an alloy member containing Mn and Cr and, after subjecting to a heat treatment, the Cr diffusion preventing layer and the coating layer are sequentially formed on the surface of the alloy member. In the heat-resistant alloy member of the present invention, by forming a film containing Zn on the surface of an alloy member containing Mn and Cr, followed by subjecting to a heat treatment, a dense Cr diffusion preventing layer made of an oxide containing Zn and Mn, and an oxide containing Zn are formed on the surface of the alloy member, and the dense Cr diffusion preventing layer made of an oxide containing Zn and Mn is formed on an interface between the alloy member and the coating layer.

The alloy member for a fuel cell of the present invention includes the heat-resistant alloy member according to any one of those described above. In such an alloy member for a fuel cell, diffusion of Cr from the alloy to the coating layer is suppressed and thus deterioration of characteristics of the fuel cell can be prevented.

In the collector member for a fuel cell of the present invention, a collector member for collecting a current from a fuel cell is made of the heat-resistant alloy member according to any one of those described above. In such a collector member for a fuel cell, good conductivity is ensured and diffusion of Cr from the collector member made of the alloy containing Cr is suppressed, and also Cr reaches the interface between an air electrode and a solid electrolyte and thus deterioration of activity can be prevented.

The cell stack of the present invention includes the above collector member for a fuel cell, and plural fuel cells which are electrically connected to each other by interposing the collector member for a fuel cell therebetween. Also, the fuel cell and the collector member for a fuel cell are bonded and electrically connected by a conductive binding material. Furthermore, a mixture layer of ZnO and the conductive binding material is preferably formed between the collector member for a fuel cell and the conductive binding material. Also, the coating layer is preferably more porous than the Cr diffusion preventing layer.

In such a cell stack, even if a thermal expansion coefficient of a conductive binding material is higher than that of the coating layer, stress caused by differential thermal expansion between the conductive binding material and the coating layer can be alleviated by the presence of the mixture layer. The coating layer can alleviate stress caused by differential thermal expansion and also can improve electrical connection reliability between the fuel cell and the collector member for a fuel cell since it is porous. The Cr diffusion preventing layer thus formed as described above is dense and thus the occurrence of vaporization of Cr in an alloy becomes difficult.

The fuel cell apparatus of the present invention includes a container, and the above cell stack housed in the container. According to the present invention, it is possible to provide a fuel cell apparatus which causes less voltage reduction and is excellent in long-term reliability.

In the heat-resistant alloy member of the present invention, an alloy member is coated with a Cr diffusion preventing layer made of an oxide containing Zn and Mn, the Cr diffusion preventing layer is thermodynamically stable and therefore it is difficult for Cr to form a solid solution, thus making it possible to suppress Cr from diffusing out from the alloy member.

BRIEF DESCRIPTION OF THE DRAWINGS

FIG. 2a is a sectional view of the collector member for a fuel cell shown in FIG. 1, taken along lines A-A, and FIG. 2b is a partially enlarged view of FIG. 2a.

DETAILED DESCRIPTION OF THE INVENTION (First Aspect)

Figure 1:
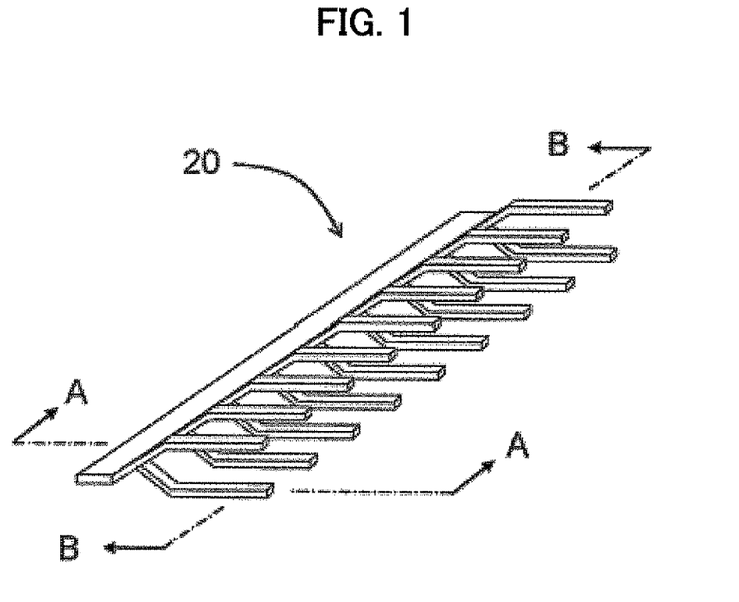
FIG. 1 is a perspective view showing one example of a collector member for a fuel cell of the present invention.
Figure 2:
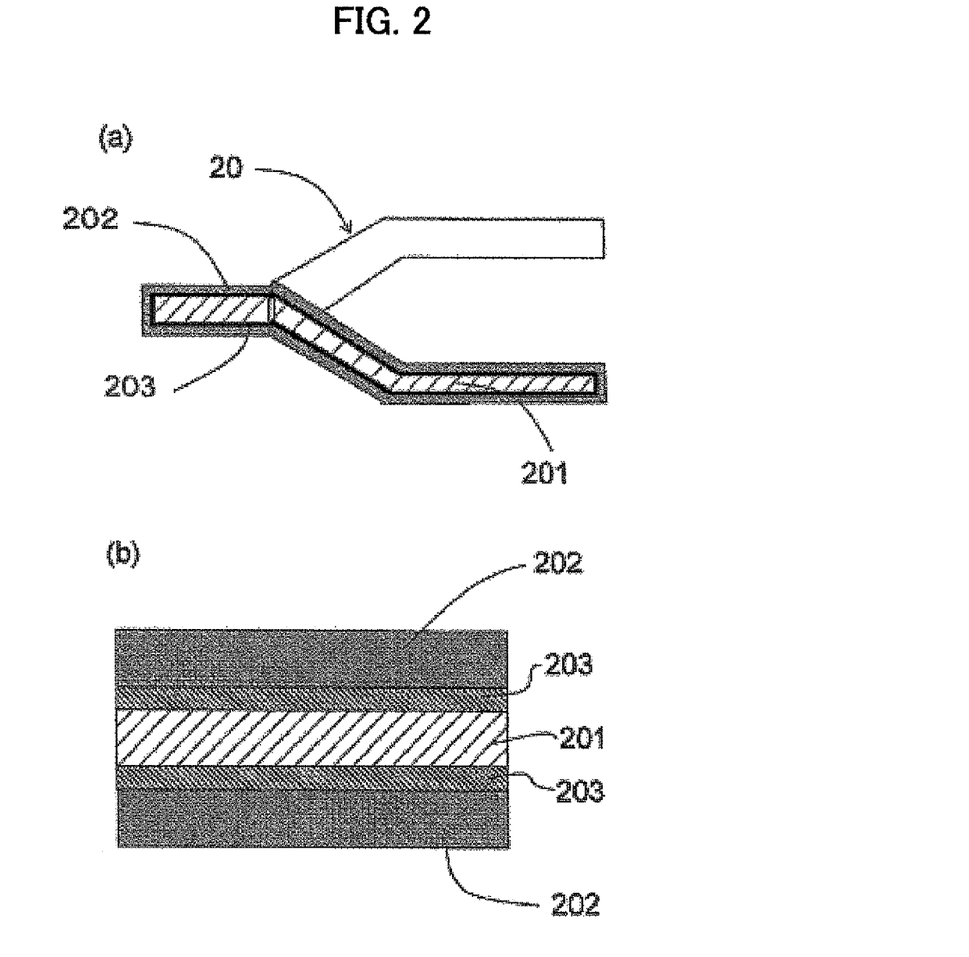
Figure 3:
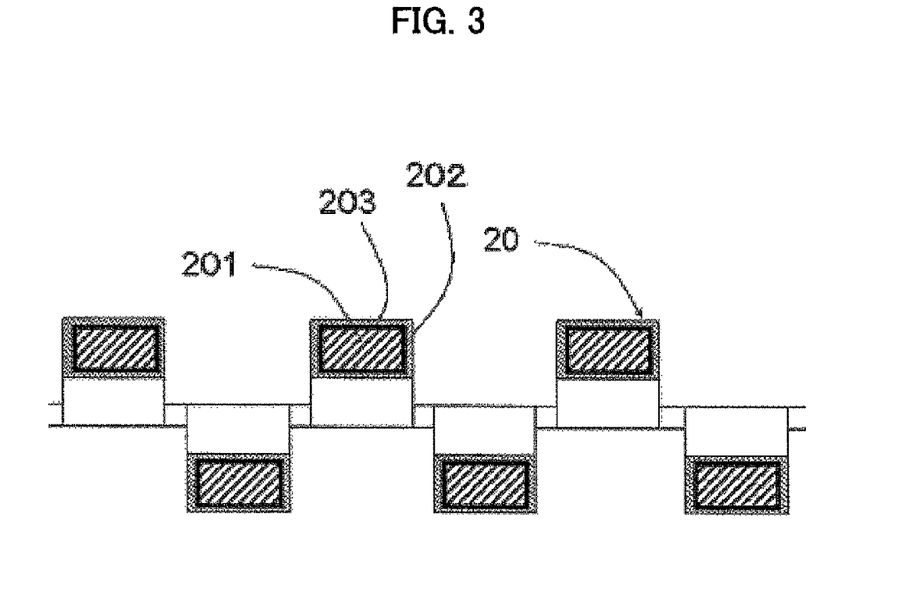
FIG. 3 is a sectional view of the collector member for a fuel cell shown in FIG. 1, taken along lines B-B.
Figure 11:
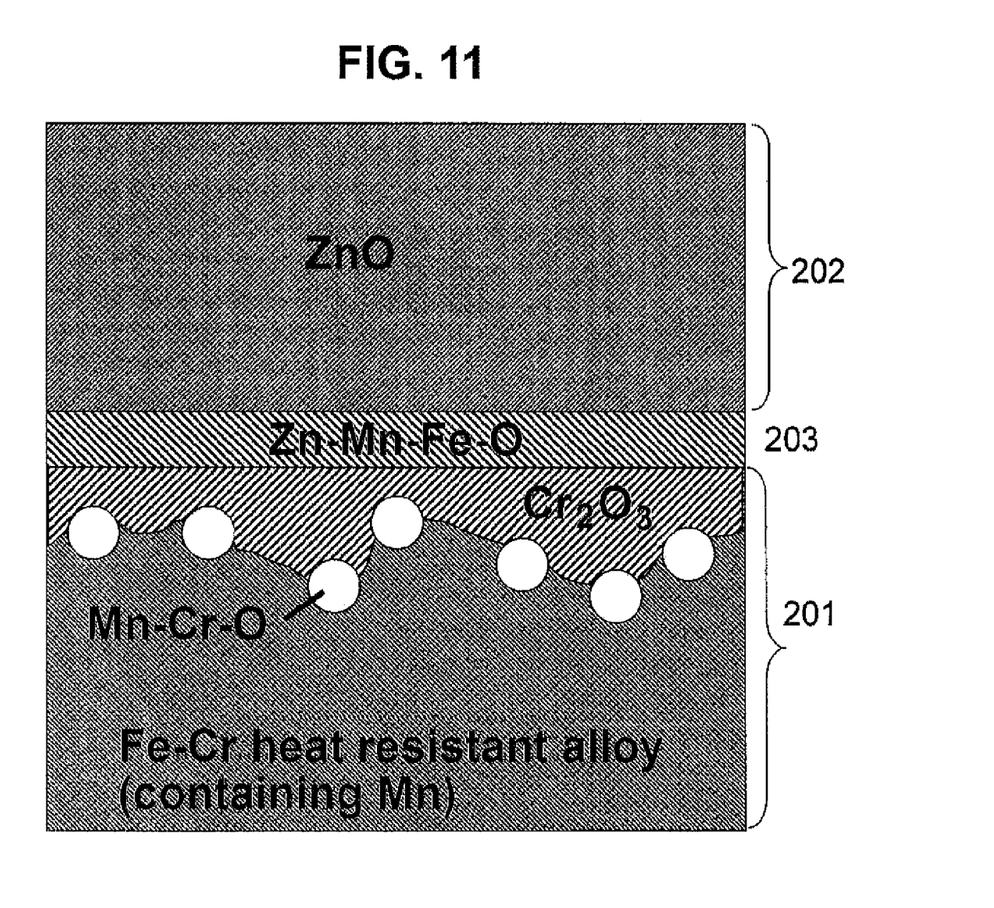
FIG. 11 is a schematic view of the interface between the collector base material and the coating layer of sample No. 2 in Table 3.

FIG. 1 is a perspective view showing one aspect of the collector member for a fuel cell according to the present invention, and FIG. 2 and FIG. 3 are sectional views showing a coated state of a coating layer 202 of a collector member for a fuel cell 20 shown in FIG. 11. FIG. 2 is a sectional view taken along lines A-A shown in FIG. 1, and FIG. 3 is a sectional view taken along lines B-B shown in FIG. 1. As shown in FIG. 1, the collector member for a fuel cell 20 is formed by forming a plate made of a heat-resistant alloy into a comb blade and alternately bending adjacent blades to an opposite side.

In the collector member for a fuel cell 20, a coating layer 202, which is made of an oxide containing zinc and is provided with conductivity, is formed on the surface of an alloy containing Cr (hereinafter referred to as a collector base material) 201, while a Cr diffusion preventing layer 203 made of an oxide containing Zn and Mn is formed between the collector base material 201 and the coating layer 202. The shape of the collector member for a fuel cell 20 of the present invention is not limited to the shape shown in FIG. 1 and may be cylindrical or mesh-like shape. In FIG. 2a and FIG. 3, the Cr diffusion preventing layer 203 was indicated by a bold line.

As the collector base material 201, an alloy containing 10 to 30% by mass of an alloy containing Cr having high conductivity and heat resistance, for example, a Fe—Cr alloy or a Ni—Cr alloy is employed. The coating layer 202 is made of zinc oxide and is formed by containing at least one kind of Al and Fe as described hereinafter.

The Cr diffusion preventing layer 203 is made of a metal oxide having at least one kind of a spinel structure, a corundum structure, a wurtzite structure and a rock salt structure, or a structure similar to these structures. The Cr diffusion preventing layer 203 is made of a Zn—Mn spinel and may contain an element such as Fe or Cr. A Zn—Mn spinel, for example, a metal oxide comprising $(Zn,Mn)Mn_2O_4$ containing Zn and Mn has the effect of suppressing diffusion of Cr since it is difficult for a metal oxide to form a solid solution with Cr.

The coating layer 202 contains ZnO and pure ZnO is an insulator. $Zn_{1+\delta}O$ serves as a cation excessive n-type semiconductor, and serves as an n-type impurity semiconductor by adding an impurity element having a high valence. Here, since Zn in ZnO is converted into positive divalent ions, conductivity is imparted by allowing a metal ion capable of converting into a positive trivalent or higher valent ion to enter solid solution. Specifically, electrons are converted into conductive electrons through a mechanism represented by the following defect equation:

[Chemical Formula 1]

<Defect Equation>

The above scheme (1) is a defect equation which represents contribution of excess Zn, and shows that one conductive electron is produced by the presence of an interstitial Zn, thus contributing to conductivity. The scheme (2) is a defect equation in a state where $Al^{3+}$ is substituted on a lattice site of Zn, and shows that two conductive electrons are emitted. The scheme (3) is a defect equation when the reaction of the scheme (1) and that of the scheme (2) simultaneously arise, and shows that conductive electrons increase. Even when not only the trivalent or higher valent positive metal element, but also another metal such as Mn or Co is contained, conductivity can be improved.

Of these metal elements capable of having three or more positive valences, zinc oxide in which Al and Fe are allowed to enter into solid solution is excellent in both the Cr diffusion prevention effect and conductivity. The coating layer used in the collector member preferably has conductivity of 1 S·cm$^{-1}$ in atmospheric air at about the power generating temperature, and the coating layer 202 can satisfy relating to conductivity in an atmospheric air at about the power generating temperature of 550 to 900° C.

Since Cr in the collector base material 201 vaporizes and diffuses out from cavities, if any, it is preferred that the Cr diffusion preventing layer 203 is densely formed so as to coat at least the entire surface of the collector base material 201. When the Cr diffusion preventing layer 203 has a thickness of 2 μm or less, particularly 1 μm or less, an adverse influence is not exerted on conductivity of the collector member even if it has some insulating properties.

Regarding the Cr diffusion preventing layer 203 and the coating layer 202 of the present invention, it is possible to form a coating layer 202 which is more porous than the dense Cr diffusion preventing layer 203 and Cr diffusion preventing layer 203 on the surface of the collector base material 201 by dipping the collector base material 201 in a paste containing Zn or ZnO, and subjecting to a heat treatment or heating upon power generation when the layer is formed by dipping.

Namely, when the Cr diffusion preventing layer 203 is made of a Zn—Mn spinel, a collector base material 201 containing Mn is dipped in a paste containing Zn or ZnO and $Fe_2O_3$ or $Al_2O_3$ and subjected to a heat treatment, Mn from the collector base material 201 reacts with Zn in the Zn paste on the surface of the collector base material 201 to form a Cr diffusion preventing layer 203 made of a Zn—Mn spinel, and thus a coating layer 202 containing Fe or Al in ZnO can be formed on the surface of the Cr diffusion preventing layer 203.

When a collector base material 201 containing no Mn is used, the collector base material is dipped in a paste containing Zn or ZnO, $Fe_2O_3$ or $Al_2O_3$, and Mn and then subjected to a heat treatment to form a Cr diffusion preventing layer 203 made of a Zn—Mn spinel on the collector base material 201, and thus a coating layer 202 containing Fe or Al in ZnO can be formed on the surface of the Cr diffusion preventing layer 203.

Furthermore, after a Cr diffusion preventing layer 203 made of a Zn—Mn spinel is formed on the collector base material 201, the collector base material 201 with the Cr diffusion preventing layer formed thereon is dipped in a paste containing Zn or ZnO and $Fe_2O_3$ or $Al_2O_3$, and then subjected to a heat treatment, and thus a coating layer 202 containing Fe or Al in ZnO can be formed.

The Cr diffusion preventing layer 203 is formed by using a method such as slurry coating, plating or vapor deposition, in addition to dipping (dip coating method of dipping a collector base material 201 in a solution containing zinc for a Cr diffusion preventing layer), and a dipping method is preferable in view of cost. When the Cr diffusion preventing layer 203 is formed using Zn, it is preferred to include a heat treating step using Zn as ZnO.

The thickness of the coating layer 202 varies depending on service life of the collector base material 201. In the case of dipping, the thickness is preferably from 5 to 100 μm, and more preferably from 10 to 50 μm. By adjusting the thickness to 5 μm or more, cavities caused by air entrainment can be prevented. By adjusting the thickness to 50 μm or less, internal stress caused by differential thermal expansion with the collector base material 201 can be suppressed as small as possible and also formation of the layer can be facilitated. Stress caused by differential thermal expansion can be alleviated since the coating layer 202 is more porous than the Cr diffusion preventing layer 203.

It is necessary that a solid electrolyte fuel cell is heated to a high temperature of about 600 to 1,000° C. so as to generate power, and thus the collector member 20 is used at a high temperature of 600 to 1,000° C. At this time, Cr may diffuse from the collector base material 201 in the form of a Cr gas. However, in the case of the present invention in which a Cr diffusion preventing layer 203 and a coating layer 202 made of ZnO are formed on the surface of the collector base material 201, the Cr diffusion preventing layer 203 makes it possible to suppress Cr diffusing out.

The reason is not sure. However, according to the present inventors, the following finding was made. Namely, Cr, which may diffuse from the collector base material 201, forms a film of $Cr_2O_3$ in the vicinity of an interface between the collector base material 201 and the Cr diffusion preventing layer 203. Since a Zn—Mn—O compound layer, in which it is difficult for Cr to form a solid solution due to thermodynamical stability, is formed and a dense Cr diffusion preventing layer 203 is formed, it is possible to suppress a Cr gas from diffusing out from the Cr diffusion preventing layer 203 without causing diffusion of Cr from the collector base material 201 to the coating layer 202, and thus it is possible to prevent Cr reaching the interface with an air electrode solid electrolyte of a fuel cell. According to the above mechanism, even when the collector base material 201 further contains Fe, Fe enters into solid solution with the Cr diffusion preventing layer 203. However, scattering of Cr is suppressed since it is difficult for Cr to form a solid solution. Furthermore, it is considered that these reactions are prescribed by diffusion and depend on the temperature and time. Therefore, the thickness of ZnO to be coated can be controlled according to applications and thus scattering of Cr can be suppressed and so-called Cr poisoning can be prevented.

Figure 4:
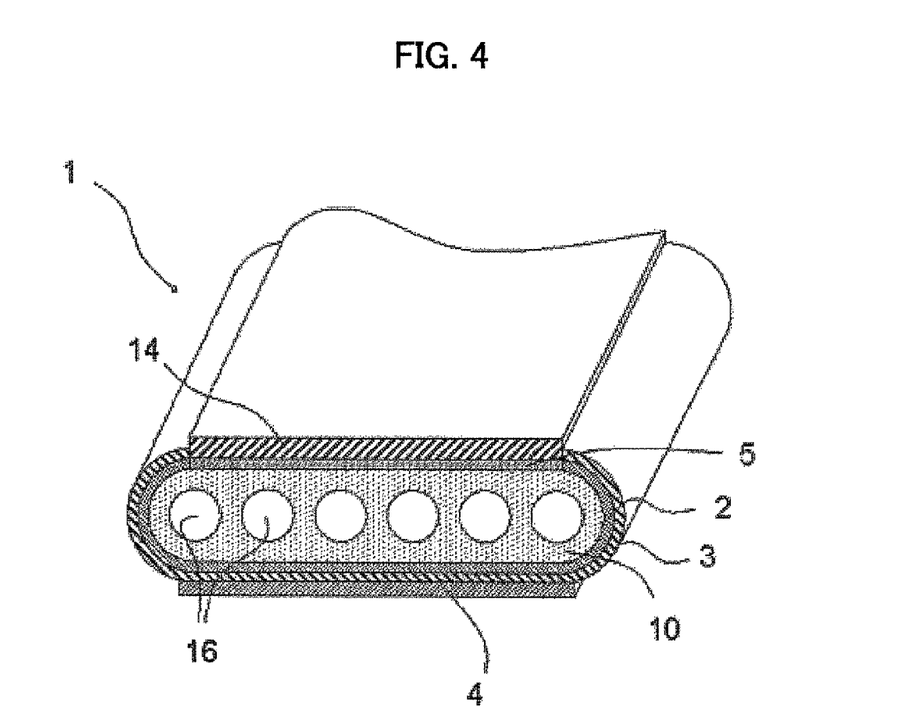
FIG. 4 is a sectional perspective view of a fuel cell of the present invention.
Figure 5:
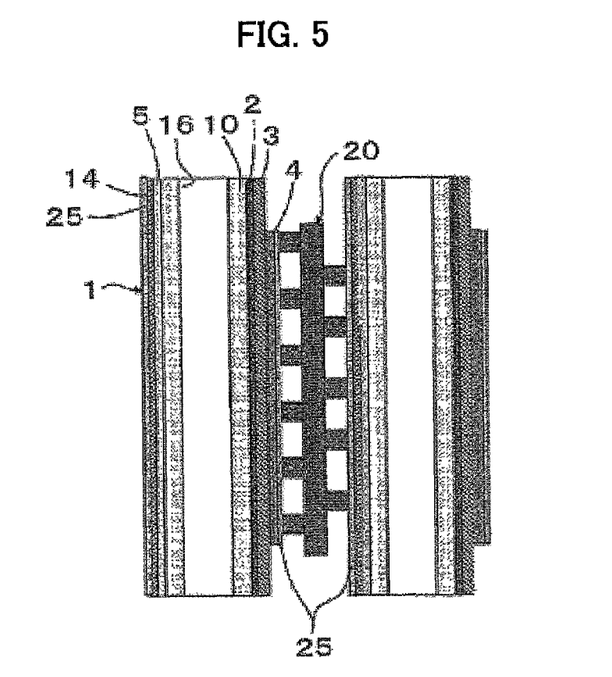
FIG. 5 is an explanatory view showing a fuel cell stack of the present invention.

FIG. 4 is a sectional perspective view of a fuel cell of the present invention, and FIG. 5 is a sectional view in which a cell stack obtained by electrically connecting fuel cells using a collector member is cut in parallel to a cross section taken along lines B-B of the collector member of FIG. 1. As shown in FIG. 5, the cell stack of the present invention has such a constitution that a collector member for a fuel cell 20 is disposed between fuel cells 1 shown in FIG. 4 thereby electrically connecting plural fuel cells 1.

As shown in FIG. 4, the fuel cell 1 is formed so that it includes a plate-like supporting substrate 10, and a fuel electrode layer 2, a solid electrolyte layer 3, an air electrode layer 4, an interconnector 5 and an air electrode material layer 14 provided around the plate-like supporting substrate 10, and the supporting substrate 10 further includes therein plural fuel gas passageways 16 extending in a direction intersecting with the stacked direction of the fuel cell 1 (cell length direction).

The supporting substrate 10 is made of a porous and conductive material and, as shown in FIG. 4, a transverse section is composed of a flat portion and arcuate portions at both ends of the flat portion. The porous fuel electrode layer 2 is formed so as to coat one of the opposing surfaces of the flat portion and the arcuate portions at both ends, and the dense solid electrolyte layer 3 is stacked so as to coat the fuel electrode layer 2. Furthermore, on the solid electrolyte layer 3, the air electrode layer 4 made of a porous conductive ceramic is stacked so as to face the fuel electrode layer 2. On the surface opposing the surface on which electrode layers 2, 4 of the supporting substrate 10 are formed, a dense interconnector 5 is formed. On the surface of the interconnector 5, the air electrode material layer 14 made of an air electrode material is formed. Here, the air electrode material is, for example, made of an oxide having a perovskite structure, such as La(Fe,Mn)O$_3$ or (La,Sr)(Co,Fe)O$_3$. It is not always necessary that the air electrode material layer 14 is formed. As shown in FIG. 4, the fuel electrode layer 2 and the solid electrolyte layer 3 are formed so that they extend to both sides of the interconnector 5 and the surface of the supporting substrate 10 is not exposed to the outside.

In the fuel cell 1 having such a structure, the portion facing the air electrode layer 4 of the fuel electrode layer 2 operates as a fuel electrode to generate power. Namely, an oxygen-containing gas is allowed to flow to the outside of the air electrode layer 4 and a fuel gas (hydrogen) is allowed to the gas passageway 16 in the flow supporting substrate 10, followed by heating to a predetermined operating temperature. Thereby, the electrode reaction of the following scheme (4) arises at the air electrode layer 4, while the electrode reaction of the following scheme (5) arises at the portion serving as a fuel electrode of the fuel electrode layer 2, thus generating power.

Air electrode: $\frac{1}{2}O_2 + 2e^- \rightarrow O^{2-}$(solid electrolyte)  (4)

Fuel electrode: $O^{2-}$(solid electrolyte)$+H_2 \rightarrow H_2O + 2e^-$  (5)

A current generated by the electrode reaction is collected through the interconnector 5 attached to the supporting substrate 10.

Between plural fuel cells, a collector member 20 for a fuel cell of the present invention is interposed as shown in FIG. 5, thereby electrically connecting the fuel cells, and thus a cell stack is formed. Namely, the collector member 20 for a fuel cell is bonded with the air electrode layer 4 of the fuel cell 1 using a conductive binding material 25 composed of a porous conductive ceramic and also bonded to the air electrode material layer 14 of an adjacent other fuel cell 1 using the conductive binding material 25 thereby electrically connecting plural fuel cells 1 in series, and thus a cell stack is formed. As the conductive binding material 25, an air electrode material is usually used. For example, a conductive perovskite type composite oxide such as La—CO composite oxide, Ag or Ag—Pd is used.

Figure 6:
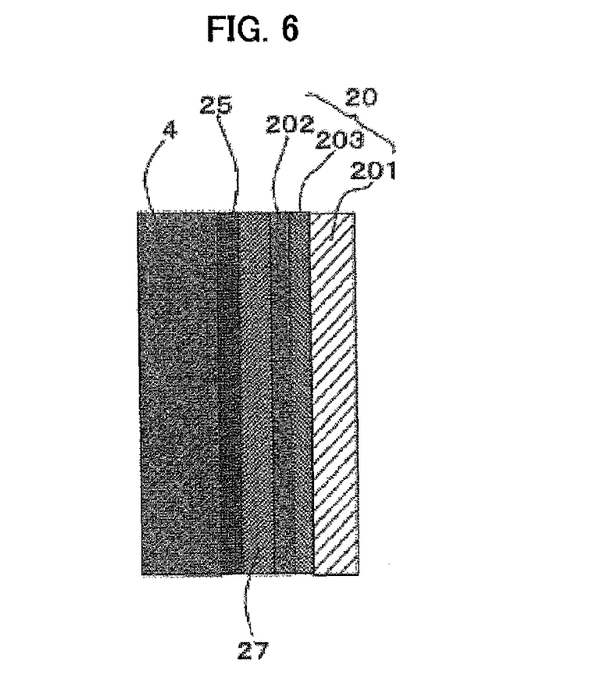
FIG. 6 is a sectional view showing a state where a mixture layer is formed between a collector member and a conductive binding material.

FIG. 6 shows a cell stack in which a mixture layer 27 of ZnO which forms a coating layer 202 of the collector member 20, and a conductive binding material is formed between the collector member 20 and the conductive binding material 25. The conductive perovskite type composite oxide such as La—Co composite oxide, which constitutes the conductive binding material 25, has a thermal expansion coefficient of about $15 \times 10^{-6}/°$ C., and ZnO, which forms the coating layer 202 of the collector member 20, has a thermal expansion coefficient of about $7 \times 10^{-6}/°$ C., and the difference in the thermal expansion coefficient is large. Stress caused by differential thermal expansion of each material can be alleviated since the mixture layer 27 is formed. The thickness of the mixture layer 27 is preferably 5 μm or more in view of stress alleviation. Without using the conductive binding material 25, the mixture layer 27 may be directly bonded to the air electrode layer of one fuel cell, and the interconnector of another fuel cell.

Such a cell stack is disposed at a manifold (not shown) to which a fuel gas is supplied, and the fuel gas supplied into the manifold passes through the gas passageway 16 of the fuel cell 1.

The fuel cell apparatus is formed by housing the cell stack in a container and arranging a fuel gas-introducing tube for supplying a fuel gas such as city gas and an air-introducing tube for supplying air in the container. A fuel cell, which hardly causes voltage reduction and is excellent in long-term reliability, can be obtained by the cell stack and the fuel cell apparatus.

While the case where the alloy member for a fuel cell of the present invention was used as the collector member 20 was described in the above aspect, the alloy member can be used, for example, as components made of other heat-resistant alloys to be housed in the container, for example, the above-described manifold, a reformer, and a wall member which forms the container.

While the case where the heat-resistant alloy member of the present invention was used as the alloy member for a fuel cell was described in the above aspect, the heat-resistant alloy member of the present invention may be used for those other than the fuel cell. For example, it can be used in those which exhibit conductivity in a high temperature atmosphere such as a lead portion of an oxygen sensor, specifically, it can be used in place of Pt, which has conventionally been used in those having conductivity in a high temperature atmosphere. In the lead portion of an oxygen sensor, a noble metal such as Pt is used so as to ensure conductivity at high temperature, resulting in high cost. The cost can be reduced by using the heat resistance conductive member of the present invention.

Furthermore, the heat-resistant alloy member of the present invention can be used in automobile engines, exhaust gas tubes, incinerators, baking furnaces and heat exchanger of hot-water supply systems.

(Second Aspect)

While the case where Zn and at least one kind of Al and Fe as a trivalent or higher valent positive metal element were added in the coating layer 202 in the above aspect, the coating layer 202 may be a coating layer to which Al and Fe are not added.

Similar to the above aspect, the collector member of this aspect is formed by sequentially forming a Cr diffusion preventing layer 203 made of an oxide containing Zn and Mn, and a coating layer 202 containing Zn on the surface of a collector base material 201 made of an alloy containing Cr.

A Cr diffusion preventing layer 203 is made of a metal oxide having at least one kind of a spinel structure, a corundum structure, a wurtzite structure and a rock salt structure, or a structure similar to these structures. The layer may contain a ZnO—MnO solid solution composed mainly of (Zn,Mn)Mn$_2$O$_4$. The Cr diffusion preventing layer 203 sometimes contains Fe and Fe forms a solid solution with a (Zn,Mn)Mn$_2$O$_4$ or ZnO—MnO solid solution.

In such a collector member for a fuel cell, when a paste containing ZnO for forming a coating layer 202 is applied on the collector base material 201 and the resultant coating film is subjected to a heat treatment at a predetermined temperature, components of the coating film react with components of the collector base material 201 to form the Cr diffusion preventing layer 203 as a dense layer between the collector base material 201 and the coating layer 202 made of ZnO, and the Cr diffusion preventing layer 203 makes it possible to suppress Cr from diffusing out from the Cr diffusion preventing layer 203.

In this aspect, the thickness of the Cr diffusion preventing layer 203 made of $ZnMn_2O_4$ is preferably 7 μm or less so as to impart conductivity to the collector member, preferably, and the thickness of the coating layer 202 made of ZnO is preferably 2 μm or less. However, actually, the resultant Cr diffusion preventing layer 203 is not made of pure $ZnMn_2O_4$ and the resultant coating layer 202 is not made of pure ZnO and these layers contain some elements. For example, when components of the collector base material 201 may diffuse into the Cr diffusion preventing layer 203 and the coating layer 202, or impurities exist in raw materials for forming the coating layer 202, conductivity of the Cr diffusion preventing layer 203 and the coating layer 202 increases. Taking account of these, the Cr diffusion preventing layer 203 and the coating layer 202 have given conductivity even if the thickness is increased to some extent.

Therefore, by controlling the thickness of the Cr diffusion preventing layer 203 and the coating layer 202 within a small thickness range so as to have conductivity in a given level or higher, the resultant member can be used as a conductive member capable of suppressing Cr from diffusing out at high temperature, for examples, can be used as the above-described collector member for a fuel cell. By controlling the thickness of the Cr diffusion preventing layer 203 and the coating layer 202 within a large thickness range so as to have fixed insulating properties, it is possible to provide an insulating member capable of suppressing Cr from diffusing out at high temperature, for example, a wall material of a container of a fuel cell, a reformer housed in the container, or a manifold equipped with a cell stack.

(Third Aspect)

Figure 7:
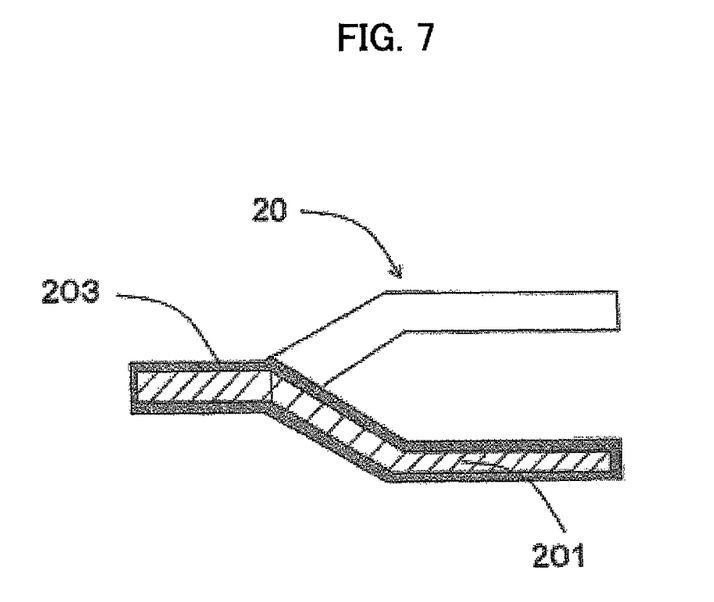
FIG. 7 is a sectional view showing a state where only a Cr diffusion preventing layer is formed on a collector base material.

While the case where the coating layer 203 was formed on the surface of the Cr diffusion preventing layer 203 was described in the above aspect, as shown in FIG. 7, only the Cr diffusion preventing layer 203 may be formed on the collector base material 201. Namely, the Cr diffusion preventing layer 203 made of an oxide containing Zn and Mn is formed on the collector base material 201, and this Cr diffusion preventing layer 203 is exposed to the outside.

In such a collector member for a fuel cell, a powder containing mainly $(Zn,Mn)Mn_2O_4$ is preliminarily prepared using a ZnO powder and a MnO powder and the resultant powder is used in a paste for dipping. The collector base material 201 is dipped in the paste and then subjected to a heat treatment, and thus only the Cr diffusion preventing layer 203 can be formed on the collector base material 201.

In FIG. 7, the surface of the collector base material 201 containing Cr is coated with the Cr diffusion preventing layer 203 made of an oxide containing Zn and Mn and the Cr diffusion preventing layer 203 is exposed. In view of handling and protection, a layer made of an oxide can also be formed on a portion of the surface of the Cr diffusion preventing layer 203.

EXAMPLE 1

First, a ZnO powder, and a $Fe_2O_3$ powder or an $Al_2O_3$ powder were mixed in a molar ratio shown in Table 1. The resultant powder mixture, a binder (aqueous 20% PVA solution), a solvent (isopropyl alcohol: IPA) and $ZrO_2$ balls each having a diameter of 15 μm were charged in a polyethylene pot and then mixed in a rotary mill for 16 hours. The powder mixture obtained by drying the mixed solution at a temperature of 130° C. was passed through a 40 mesh filter, formed into a shape of a test piece measuring 3×4×50 μm under a pressure of 1 t using a press, and then baked at a temperature of 1,050° C. or 1,300° C. for 2 hours to make a test piece. Conductivity of this test piece was measured by the four-terminal method in atmospheric air at a temperature of 550 to 900° C. The results are shown in Table 1. For example, the sample No. 3 is the sample produced by mixing 99 mol % of ZnO and 0.5 mol % of $Fe_2O_3$.

TABLE 1

| | | Sample No. | | | | | | | |
|---|---|---|---|---|---|---|---|---|---|
| | | 1 | 2 | 3 | 4 | 5 | 6 | 7 | 8 |
| M (Additive element) | | — | | | Fe | | | | Al |
| M/(Zn + M)/mol % | | 0 | 0.5 | 1 | 2 | 2.5 | 3 | 10 | 2 |
| Calcination temperature/° C. | | 1,050 | 1,050 | 1,050 | 1,050 | 1,050 | 1,050 | 1,050 | 1,300 |
| Conductive measuring temperature/° C. | 900 | 0.04 | 36 | 48 | 52 | 21 | 13 | 9 | 208 |
| | 850 | 0.03 | 34 | 47 | 51 | 13 | 8 | 5 | 216 |
| | 800 | 0.02 | 32 | 44 | 49 | 8 | 5 | 3 | 225 |
| | 750 | 0.02 | 30 | 42 | 47 | 4 | 3 | 2 | 233 |
| | 700 | 0.01 | 29 | 40 | 44 | 3 | 2 | 1 | 241 |
| | 650 | — | 25 | 38 | 42 | 3 | 2 | 0.5 | 249 |
| | 600 | — | 22 | 33 | 37 | 2 | 2 | 0.3 | 258 |
| | 550 | — | 19 | 30 | 34 | 2 | 1 | 0.2 | 266 |

Note)
—: impossible to measure
Unit: $S \cdot cm^{-1}$

As is apparent from the results shown in Table 1, the samples Nos. 2 to 8 containing Fe or Al added therein show remarkably improved conductivity as compared with the sample No. 1 containing no additive element, and also have sufficient conductivity suited for use as a base material for electrical connection between fuel cells. Each sample was analyzed using powder X-ray diffractometry and a wavelength disperse electron probe micro-analysis (EPMA) method. The analytical results revealed that no heterogeneous phase exists, and the additive elements are uniformly dispersed and form a solid solution with ZnO.

EXAMPLE 2

First, a ZnO powder and a $Fe_2O_3$ powder or an $Al_2O_3$ powder were mixed in a molar ratio shown in Table 2. Regarding the powder containing Al added therein, the powder obtained by mixing (hereinafter referred to as a powder mixture) was calcined at a temperature of 1300° C. for 2 hours and then ground to obtain a ground powder. The powder mixture or ground powder, an acrylic binder, mineral spirits as a diluent and dibutyl phthalate (DBP) as a dispersant were mixed to prepare a dipping solution used to form a coating layer.

TABLE 2

|  | Sample No. | | |
| --- | --- | --- | --- |
|  | 9 | 10 | 11 |
| M (Additive element) | — | Fe | Al |
| M/(Zn + M)/mol % | 0 | 2 | 2 |
| Calcination temperature/° C. | — | — | 1,300 |
| Diffusion of Cr | None | None | None |

Note)
—: not calcined

A collector base material of a Fe—Cr heat-resistant alloy sheet (containing 75% by mass of Fe, containing the remainder Cr, Mn and Ni) having a thickness of 0.4 mm, a width of 20 mm and a length of 120 mm was subjected to a heat treatment in atmospheric air at 750° C. so as to enhance wettability with the dipping solution, dipped in the dipping solution thereby coating the entire surface of the collector base material, and then dried. Furthermore, a binder removing treatment was carried out at a temperature of 130° C. for 30 minutes, then at a temperature of 500° C. for 2 hours, followed by baking in a furnace at a temperature of 1,050° C. for 2 hours to form a coating layer having a thickness of about 20 µm. A Cr diffusion preventing layer having a thickness of about 1 µm was formed between the collector base material and the coating layer.

Figure 8:
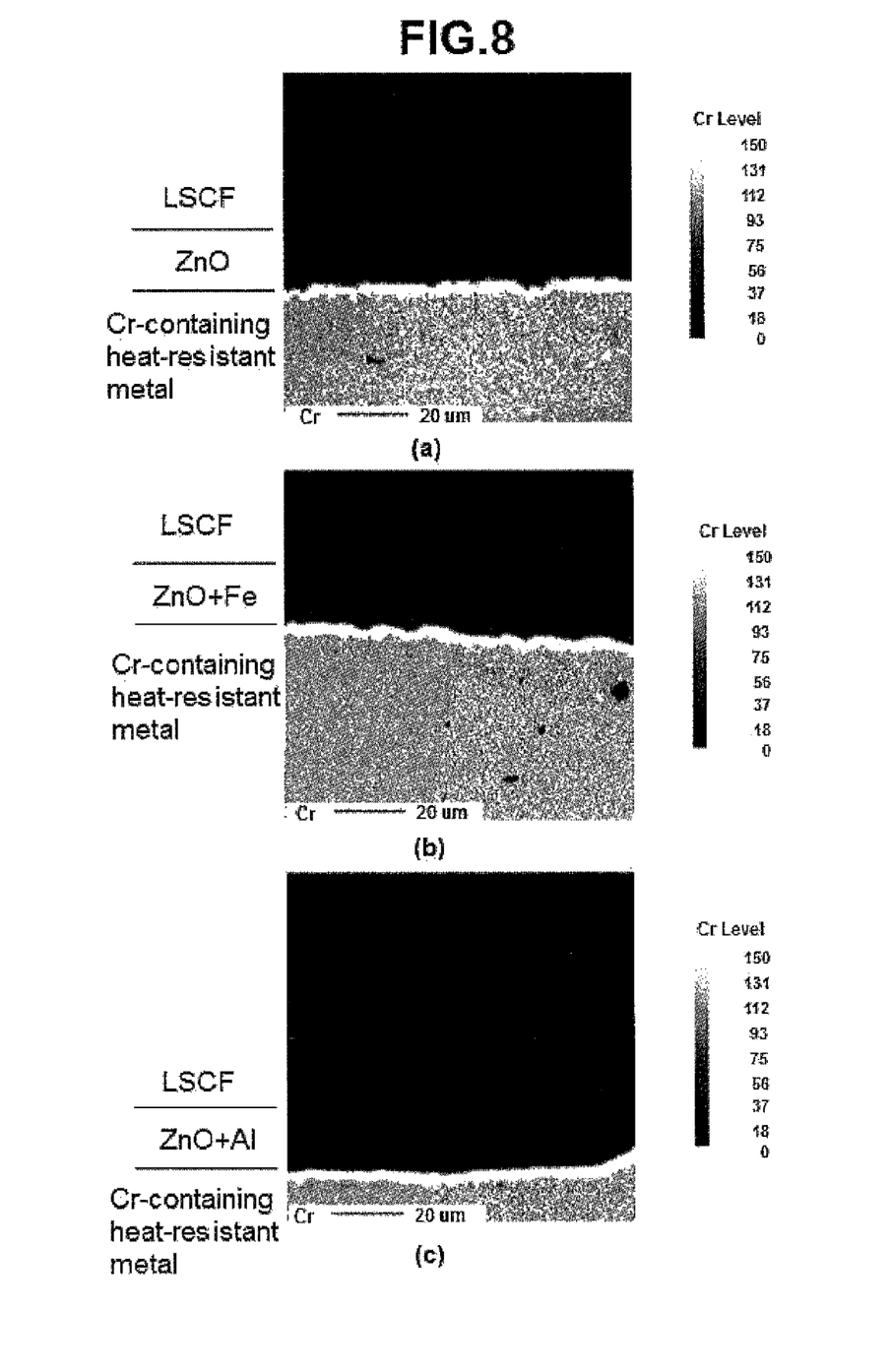
FIG. 8 is a diagram showing EPMA analytical results in the vicinity of a coating layer of the collector member for a fuel cell of Example 2.

Then, the collector member with the coating layer formed thereon was dipped in a slurry prepared by mixing a $La_{0.6}Sr_{0.4}Co_{0.2}Fe_{0.8}O_3$ (LSCF) powder having an average particle size of 0.5 µm, an acrylic binder and a glycolic solvent, and then subjected to the same baking treatment to form a LSCF film having a thickness of about 20 µm on the surface of the coating layer, thus obtaining a test piece. The cross section in the vicinity of the coating layer of the test piece was examined by EPMA analysis. In the EPMA analysis, JXA-8100 manufactured by JEOL, Inc. was used. Measurement was carried out under the conditions of an acceleration voltage of 15 kV, a probe current of $2.0 \times 10^{-7}$ A and an analysis area of 50 µm×50 µm using LIF as an analyzing crystal. FIG. 8 is a diagram showing the EPMA analytical results about distribution of Cr in the vicinity of a coating layer.

As is apparent from the results shown in FIG. 8, similar to the sample No. 9 made of zinc oxide containing no additive element therein, the samples Nos. 10 and 11 made of zinc oxide containing Fe or Al added therein effectively suppress diffusion of Cr. Namely, Cr was scarcely detected on the inside of the coating layer and the LSCF film. Since the LSCF film easily reacts with Cr to form a reaction product, even if Cr diffuses out from the coating layer, a reaction product of Cr is certainly formed on the LSCF film and Cr does not diffuse out.

EXAMPLE 3

First, a ZnO powder having an average particle diameter of 0.6 µm, a $Fe_2O_3$ powder having an average particle diameter of 0.4 µm, a $Co_3O_4$ powder having an average particle diameter of 0.5 µm, a NiO powder having an average particle diameter 0.5 µm, an acrylic binder and mineral spirits as a diluent were mixed in a mixing ratio of 100:5:72 to prepare a dipping solution for a coating layer.

A collector base material of a Fe—Cr heat-resistant alloy sheet (containing 75% by mass of Fe, and containing the remainder Cr, Mn and Ni) having a thickness of 0.4 mm, a width of 20 mm and a length of 120 mm was subjected to a heat treatment in atmospheric air at 1,050° C. so as to enhance wettability with the dipping solution, dipped in the dipping solution thereby coating the entire surface of the collector base material, and then dried. The coated collector base material was subjected to a binder removing treatment at 130° C. for one hour, then at 500° C. for 2 hours. The coating layer formed of a ZnO powder was baked in a furnace at 1,050° C. for 2 hours to form a coating layer having a thickness of 15 µm. The coating layer thus formed was made of ZnO. Mn and Fe from the collector base material formed solid solution in the coating layer. Furthermore, a Cr diffusion preventing layer made of Zn—Mn—Fe was formed between the collector base material and the coating layer.

Using a $Fe_2O_3$ powder, a $Co_3O_4$ powder and a NiO powder, the resultant powder mixture was baked in a furnace at 1,050° C. for 2 hours to form a coating layer having a thickness of 15 µm.

A collector member with the coating layer formed thereon was dipped in a slurry prepared by mixing a $La_{0.6}Sr_{0.4}Co_{0.2}Fe_{0.8}O_3$ (LSCF) powder having an average particle diameter of 0.5 µm, an acrylic binder and a glycolic solvent to form a LSCF film having a thickness of 15 µm on the surface of the coating layer, and thus a test piece (sample) was made.

The test piece thus obtained was exposed to an atmospheric air atmosphere containing 20% steam at 850° C. for 100 hours and a cross section of the LSCF film was examined by an EPMA (wavelength disperse X-ray microanalyzer). The EPMA analysis was carried out using JXA-8100 manufactured by JEOL, Inc. under the conditions of an acceleration voltage of 15 kV, a probe current of $2.0 \times 10^{-7}$ A and an analysis area of 50 µm×50 µm. LiF was used as an analyzing crystal. The count, which is proportional to the content of Cr, was measured at a position about 10 µm apart from the interface between the coating layer and the LSCF layer toward the LSCF layer side. The results are shown in Table 3. Assuming that the count of Cr at the coating layer made of $Fe_2O_3$ is 1.0, the ratio to the count of Cr of each coating layer was determined. The results are described in parenthesis in Table 3.

Since the LSCF film easily reacts with Cr to form a reaction product, even if Cr diffuses out from the coating layer, a reaction product of Cr is certainly formed on the LSCF film. Therefore, the smaller the content of Cr in the cross section of the LSCF film, the smaller the amount of Cr diffused out from the coating layer.

Figure 9:
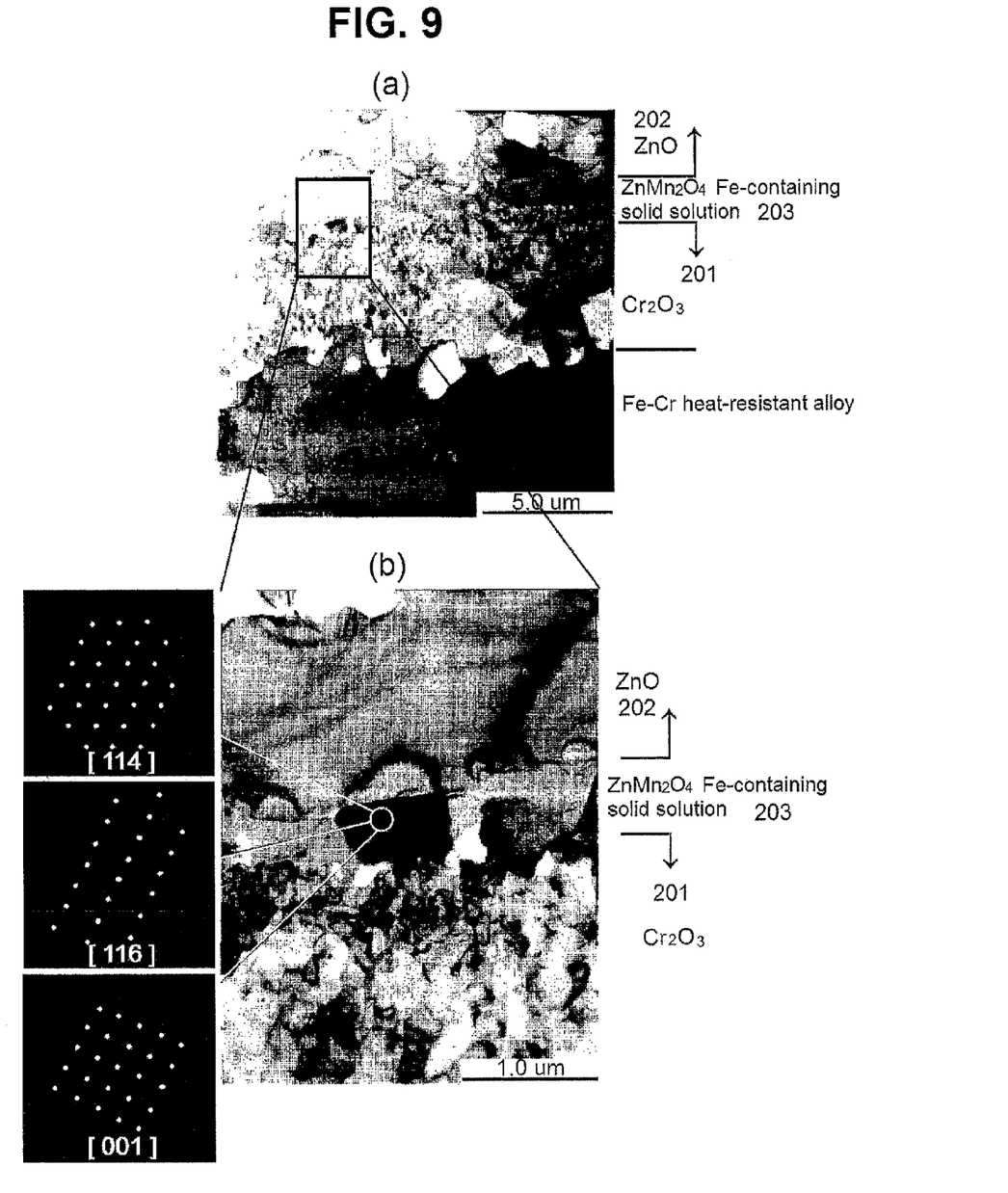
FIG. 9 is a TEM micrograph of the sample No. 2 in Table 3.

To finely analyze the interfacial portion between the collector member and the coating layer of the sample No. 2, an interfacial portion cut out using a focused ion beam working device (FIB) was subjected to TEM (transition electron microscope) analysis. In the TEM analysis, JEM2010F manufactured by JEOL, Inc. was used and observation was made at an acceleration voltage of 200 kV. A TEM micrograph (magnification ×6,000) is shown in FIG. 9a, while a TEM micrograph (magnification ×30,000) and an electron diffraction image ($ZnMn_2O_4$) are shown in FIG. 9b.

Figure 10:
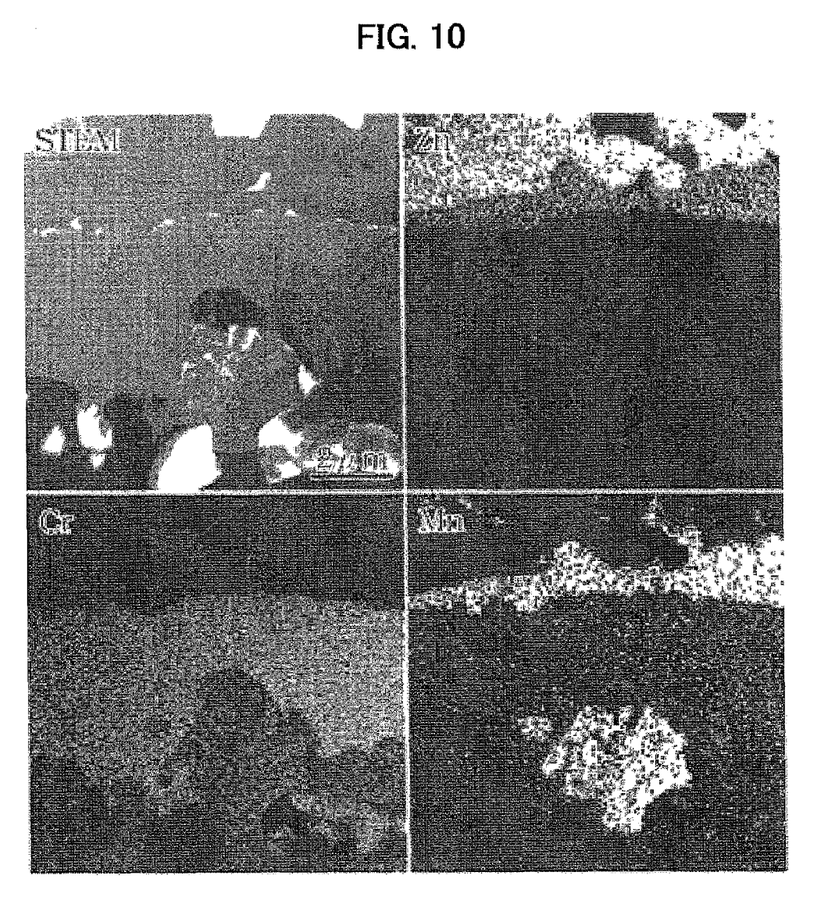
FIG. 10 is a distribution diagram of Cr, Zn and Mn of the sample No. 2 in Table 3.

Using a TEM-EDS (energy-dispersive X-ray spectrometer), elementary analysis of a Cr diffusion preventing layer formed on the interface between the collector member and the coating layer was carried out. The analytical results of Cr, Zn and Mn are shown in FIG. 10. A schematic view of the interface obtained from these results is shown in FIG. 11. The analytical results of the TEM micrograph (magnification×30,000) revealed that the Cr diffusion preventing layer contains no voids and is dense. The analytical results of the electron diffraction image and TEM-EDS revealed that the Cr diffusion preventing layer is made of $ZnMn_2O_4$ and Fe forms a solid solution. In the coating layer, Mn and Fe form a solid solution.

TABLE 3

| Sample No. | Cr diffusion preventing layer | Coating layer | Amount of Cr in LSCF film (count number) | |
|---|---|---|---|---|
| | | | After formation | After 100 hours |
| *1 | — | None | 35 (1.8) | 35 (1.8) |
| 2 | Zn—Mn—Fe—O | ZnO | 2 (0.1) | 2 (0.1) |
| *3 | — | $Fe_2O_3$ | 20 (1.0) | 25 (1.3) |
| *4 | — | $Co_3O_4$ | 20 (1.0) | 22 (1.1) |
| *5 | — | NiO | 18 (0.9) | 22 (1.1) |

Note)
The symbol * denotes a sample which is not within the scope of the present invention.
Numeral in parenthesis denotes a count ratio assuming that a Cr count ratio immediately after formation of a coating layer of $Fe_2O_3$ is 1.0.

As is apparent from the results shown in Table 3, in the sample No. 3 in which the coating layer is formed of a $Fe_2O_3$ powder, the amount of Cr measured at a position 10 μm apart from the interface between the coating layer and the LSCF layer toward the LSCF layer side was 20 in terms of the count number. Assuming that the count ratio is 1.0, the count ratio of the sample which does not have the diffusion preventing layer but has only the LSCF layer (sample No. 1) was 1.8 and the count ratio of the samples having the coating layer made of a $Co_3O_4$ powder and a NiO powder (samples Nos. 4 and 5) was nearly the same as that of the sample made by using a $Fe_2O_3$ powder.

The count ratio of the sample using a ZnO powder in the coating layer of the present invention (sample No. 2) is such a small count ratio as 0.1. After exposing in an atmospheric air containing 20% steam at 850° C. for 100 hours, the count ratio was small as 0.1, and it is apparent that very little Cr diffusion occurs in the alloy member for a fuel cell of the present invention.

EXAMPLE 4

A cell stack shown in FIG. 5 was produced by arranging three fuel cells, interposing the collector member (FIG. 1 to FIG. 3) of the sample No. 2 in Table 3 of Example 3 between the three fuel cells, and bonding the collector member, an air electrode of the fuel cell and an oxygen electrode material layer on the surface of an interconnector using LSCF used in Example 3.

The resultant cell stack was heated to 750° C. and then hydrogen was supplied to a fuel gas passageway of the fuel cell in an amount which enables a fuel utilization factor to be controlled to 75%. Air was supplied around the fuel cell at a rate of 30 L/min and the current density was controlled to 3,000 A/m². A potential tap was bonded to each of two collector members and an output of a center fuel cell was measured. As a result, it was 660 mV.

EXAMPLE 5

First, a $ZnMn_2O_4$ powder having an average particle diameter of 0.6 μm, a $Fe_2O_3$ powder having an average particle diameter of 0.4 μm, a $Co_3O_4$ powder having an average particle diameter of 0.5 μm, a NiO powder having an average particle diameter of 0.5 μm, an acrylic binder and mineral spirits as a diluent were mixed in a mixing ratio of 100:5:72 to prepare a dipping solution for a Cr diffusion preventing layer.

A collector base material of a Fe—Cr heat-resistant alloy sheet (containing 75% by mass of Fe, containing the remainder Cr, Mn and Ni) having a thickness of 0.4 mm, a width of 20 mm and a length of 120 mm was subjected to a heat treatment in atmospheric air at 1,050° C. so as to enhance wettability with the dipping solution, dipped in the dipping solution thereby coating the entire surface of the collector base material, and then dried. Furthermore, a binder removing treatment was carried out at a temperature of 130° C. for one hour, then at a temperature of 500° C. for 2 hours, followed by baking in a furnace at a temperature of 1,050° C. for 2 hours to form a Cr diffusion preventing layer having a thickness of about 15 μm.

Then, the collector member with the Cr diffusion preventing layer formed thereon was dipped in a slurry prepared by mixing a $La_{0.6}Sr_{0.4}CO_{0.2}Fe_{0.8}O_3$ (LSCF) powder having an average particle diameter of 0.5 μm, an acrylic binder and a glycolic solvent to form a LSCF film having a thickness of 15 μm on the surface of the Cr diffusion preventing layer, and thus a test piece (sample) was made.

The test piece thus obtained was exposed to an atmospheric air atmosphere containing 20% steam at 850° C. for 100 hours and a cross section of the LSCF film was examined by an EPMA (wavelength disperse X-ray microanalyzer). The EPMA analysis was carried out using JXA-8100 manufactured by JEOL, Inc. under the conditions of an acceleration voltage of 15 kV, a probe current of $2.0 \times 10^{-7}$ A and an analysis area of 50 μm×50 μm. LiF was used as an analyzing crystal. The count, which is proportional to the content of Cr, was measured at a position about 10 μm apart from the interface between the coating layer and the LSCF layer toward the LSCF layer side. The results are shown in Table 4. Assuming that the count of Cr at the coating layer made of $Fe_2O_3$ is 1.0, the ratio to the count of Cr of each coating layer was determined. The results are described in parenthesis in Table 4.

Since the LSCF layer easily reacts with Cr to form a reaction product, even if Cr diffuses out from the coating layer, a reaction product of Cr is certainly formed on the LSCF film. Therefore, the smaller the content of Cr in the cross section of the LSCF layer, the smaller the amount of Cr diffused out from the coating layer.

The Cr diffusion preventing layer thus formed was analyzed by a transition electron microscope (TEM). The analytical results revealed that the $ZnMn_2O_4$ powder, the $Fe_2O_3$ powder, the $Co_3O_4$ powder and the NiO powder exist as crystals. The Cr diffusion preventing layer cut out using a focused ion beam working device (FIB) was observed by a transition electron microscope (TEM) (magnification ×30,000). The results revealed that the Cr diffusion preventing layer contains no voids and is dense. In the TEM analysis, JEM2010F manufactured by JEOL, Inc. was used and an observation was made at an acceleration voltage of 200 kV.

TABLE 4

| Sample No. | Cr diffusion preventing layer | Amount of Cr in LSCF film (count number) | |
|---|---|---|---|
| | | After formation | After 100 hours |
| *1 | None | 35 (1.8) | 35 (1.8) |
| 2 | $ZnMn_2O_4$ | 1 (0.05) | 1 (0.05) |
| *3 | $Fe_2O_3$ | 20 (1.0) | 25 (1.3) |
| *4 | $Co_3O_4$ | 20 (1.0) | 22 (1.1) |
| *5 | NiO | 18 (0.9) | 22 (1.1) |

As is apparent from the results shown in Table 4, the sample using a $ZnMn_2O_4$ powder in a Cr diffusion preventing layer (sample No. 2) shows such a small count ratio as 0.05 after 100 hours (after exposure to atmospheric air containing 20% steam at 850° C. for 100 hours) have passed since the production and the alloy member for a fuel cell of the present invention causes very little Cr diffusion.

What is claimed is:

1. A cell stack comprising:
    (a) a collector member for collecting current from a fuel cell, wherein the collector member is made of a heat-resistant alloy member; and
    (b) plural solid oxide fuel cells which are electrically connected to each other by interposing the collector member therebetween,
    wherein the heat-resistant alloy member comprises
        a Cr diffusion preventing layer is made of a metal oxide having a spinel crystal structure, wherein said metal oxide contains zinc and manganese,
        a coating layer made of an oxide containing Zn, in which a trivalent or higher valent positive metal element is in solid solution, is formed on the surface of the Cr diffusion preventing layer and
        an alloy member containing Cr, whose surface is coated with the Cr diffusion preventing layer, and
    wherein the Cr diffusion preventing layer and the coating layer have conductivity at temperatures of 550-900° C.

2. The cell stack according to claim 1, wherein the coating layer contains at least one kind of Al and Fe as the trivalent or higher valent positive metal element.

3. The cell stack according to claim 1, wherein the coating layer has conductivity of 1 $S \cdot cm^{-1}$ or more at a temperature of 550 to 900° C.

4. The cell stack according to claim 1, wherein the Cr diffusion preventing layer is made of $(Zn,Mn)Mn_2O_4$.

5. The cell stack according to claim 1, wherein the fuel cell and the collector member for a fuel cell are bonded and electrically connected by a conductive binding material.

6. A fuel cell apparatus comprising a container, and the cell stack according to claim 1 housed in the container.

* * * * *